United States Patent
Guo

(10) Patent No.: US 12,293,311 B2
(45) Date of Patent: *May 6, 2025

(54) VEHICLE DAMAGE ASSESSMENT METHOD, APPARATUS, AND DEVICE

(71) Applicant: Advanced New Technologies Co., Ltd., Grand Cayman (KY)

(72) Inventor: Zhiyou Guo, Zhejiang (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 831 days.

This patent is subject to a terminal disclaimer.

(21) Appl. No.: 17/370,984

(22) Filed: Jul. 8, 2021

(65) Prior Publication Data
US 2021/0334548 A1 Oct. 28, 2021

Related U.S. Application Data

(63) Continuation of application No. 16/918,888, filed on Jul. 1, 2020, now Pat. No. 11,087,138, which is a
(Continued)

(30) Foreign Application Priority Data

Mar. 27, 2018 (CN) .......................... 201810259950.4

(51) Int. Cl.
*G06K 9/00* (2022.01)
*G06Q 10/06* (2023.01)
(Continued)

(52) U.S. Cl.
CPC ............. *G06Q 10/06* (2013.01); *G06Q 40/08* (2013.01); *G06T 7/0002* (2013.01); *G06V 20/00* (2022.01);
(Continued)

(58) Field of Classification Search
CPC ....... G06T 7/0002; G06T 7/0004; G06T 7/70; G06T 7/73; G06T 7/74; G06T 7/75;
(Continued)

(56) References Cited

U.S. PATENT DOCUMENTS 6,696,978 B2  2/2004 Trajkovic et al.
9,070,289 B2  6/2015 Saund et al.
(Continued)

FOREIGN PATENT DOCUMENTS

CN   104932359 A   9/2015
CN   106127142 A   11/2016
(Continued)

*Primary Examiner* — Eric Rush
(74) *Attorney, Agent, or Firm* — Seed IP Law Group LLP

(57) ABSTRACT

Implementations of the present specification disclose a vehicle damage assessment method, apparatus, and device. The method includes: collecting a first video image including an identification of a target vehicle under damage assessment; in response to that the first video image meets the determined requirement for capturing an identification, collecting a second video image including a damage to the target vehicle; and assessing the damage to the target vehicle based on the first video image and the second video image in response to that the second video image meets the determined requirement for capturing a vehicle damage feature.

20 Claims, 7 Drawing Sheets

Related U.S. Application Data continuation of application No. PCT/CN2018/123336, filed on Dec. 25, 2018.

(51) Int. Cl.
| | | |
|---|---|---|
| *G06Q 40/08* | (2012.01) | |
| *G06T 7/00* | (2017.01) | |
| *G06V 20/00* | (2022.01) | |
| *G06V 20/40* | (2022.01) | |
| *G06V 20/58* | (2022.01) | |
| *G08G 1/017* | (2006.01) | |
| *H04N 23/61* | (2023.01) | |
| *G06V 20/62* | (2022.01) | |

(52) U.S. Cl.
CPC ............ *G06V 20/46* (2022.01); *G06V 20/584* (2022.01); *G08G 1/0175* (2013.01); *H04N 23/61* (2023.01); *G06T 2207/10016* (2013.01); *G06T 2207/30248* (2013.01); *G06V 20/625* (2022.01); *G06V 2201/08* (2022.01)

(58) Field of Classification Search
CPC ............ G06T 7/80; G06T 2207/10004; G06T 2207/10016; G06T 2207/10024; G06T 2207/30248; G06T 2207/30252; G06T 2207/30268; G06V 10/10; G06V 10/12; G06V 10/22; G06V 10/24; G06V 10/40; G06V 10/70; G06V 10/74; G06V 10/761; G06V 20/00; G06V 20/17; G06V 20/40; G06V 20/44; G06V 20/46; G06V 20/56; G06V 20/584; G06V 20/59; G06V 20/625; G06V 2201/07; G06V 2201/08; G06Q 10/06; G06Q 10/20; G06Q 40/08; G06F 18/00; G06F 18/20; G08G 1/017; G08G 1/0175; H04N 23/60; H04N 23/61; H04N 23/63; H04N 23/64; H04N 23/66; H04N 23/663; H04N 23/667; H04N 23/67; H04N 23/675; H04N 23/68; H04N 23/69; H04N 23/695; B64U 2101/30; B60W 50/0205; B60W 2050/021; G01N 21/88; G01N 21/8803; G01N 21/8806; G01N 21/8851; G01N 21/9515; G01N 21/952; G01N 2021/8854; G01N 2021/8861; G01N 2021/8887; B60R 16/0232; B60R 16/0234
USPC ........ 382/100, 103–105, 141, 152–159, 173, 382/180–182, 190, 209, 217, 218, 382/224–229, 254, 255, 275, 276, 282, 382/283, 291, 292, 305–307, 312, 317, 382/325; 340/436, 438, 937; 701/1, 701/29.1, 29.3, 29.6, 29.7, 30.5, 31.4, 701/31.6, 31.7, 32.2, 32.8, 33.2, 33.7, 701/34.2, 34.3, 34.4; 705/4; 348/125, 348/128–130, 135, 142–143, 148, 348/169–172

See application file for complete search history.

(56) References Cited

U.S. PATENT DOCUMENTS

| | | | |
|---|---|---|---|
| 9,824,453 B1* | 11/2017 | Collins | .................. G06V 20/20 |
| 9,886,771 B1 | 2/2018 | Chen et al. | |
| 10,089,396 B2 | 10/2018 | Endras et al. | |
| 10,229,588 B2 | 3/2019 | Che et al. | |
| 10,529,205 B2 | 1/2020 | Arai et al. | |
| 10,580,075 B1* | 3/2020 | Brandmaier | ........... G06Q 40/08 |
| 10,692,160 B1* | 6/2020 | Lyons | .................... G06V 20/17 |
| 10,762,572 B1* | 9/2020 | Hopkins | .................. G06T 5/20 |
| 10,783,585 B1 | 9/2020 | Banerjee et al. | |
| 10,867,327 B1* | 12/2020 | Wilbert | .................. G06V 20/62 |
| 2004/0032906 A1 | 2/2004 | Lillig | |
| 2005/0251427 A1 | 11/2005 | Dorai et al. | |
| 2006/0269105 A1 | 11/2006 | Langlinais | |
| 2009/0153668 A1 | 6/2009 | Kim et al. | |
| 2012/0263352 A1 | 10/2012 | Fan et al. | |
| 2013/0272579 A1 | 10/2013 | Burry et al. | |
| 2013/0329052 A1* | 12/2013 | Chew | ..................... G06V 20/52 |
| | | | 348/159 |
| 2013/0329943 A1 | 12/2013 | Christopulos et al. | |
| 2014/0320590 A1* | 10/2014 | Laurentino | ........ H04N 21/2543 |
| | | | 348/14.08 |
| 2014/0334668 A1* | 11/2014 | Saund | ........................ G06T 7/20 |
| | | | 382/103 |
| 2015/0032580 A1 | 1/2015 | Altermatt et al. | |
| 2016/0140778 A1 | 5/2016 | Bailly et al. | |
| 2016/0342834 A1* | 11/2016 | Ragnet | .................... G06V 20/62 |
| 2017/0148102 A1 | 5/2017 | Franke et al. | |
| 2017/0293894 A1 | 10/2017 | Taliwal et al. | |
| 2017/0308088 A1* | 10/2017 | Sabe | ..................... H04N 23/698 |
| 2018/0165541 A1* | 6/2018 | Amico | ................. G06V 10/141 |
| 2020/0034958 A1 | 1/2020 | Campbell et al. | |
| 2020/0050867 A1* | 2/2020 | Zhang | .................... G06V 20/10 |
| 2021/0375032 A1* | 12/2021 | Leise | ..................... G06V 10/82 |

FOREIGN PATENT DOCUMENTS

| | | | | |
|---|---|---|---|---|
| CN | 106658173 A | | 5/2017 | |
| CN | 107194323 A | * | 9/2017 | ............. G06V 20/10 |
| CN | 107368776 A | | 11/2017 | |
| CN | 107563893 A | | 1/2018 | |
| CN | 108647563 A | | 10/2018 | |
| TW | M478859 U | | 5/2014 | |

* cited by examiner

VEHICLE DAMAGE ASSESSMENT METHOD, APPARATUS, AND DEVICE

BACKGROUND

Technical Field

The present specification relates to the field of computer technologies, and in particular, to image processing.

Technical Field

With the rapid development of the automotive industry, the production volume and sale volume of vehicles and the vehicle population are increasing. With the rapid increase of the number of vehicles, the improvement of roads (especially the increase of expressways and overpasses), and the increase of vehicle speed and the collision damage caused by traffic accidents, the automobile survey and damage assessment, and automobile insurance and compensation industries are also rising.

When a traffic accident occurs to an insured vehicle, an insurance organization first needs to make a survey and assess damage to the vehicle. The vehicle damage assessment is a comprehensive analysis of the site of vehicle collision and accident through scientific and systematic professional inspection, testing, and survey means based on the vehicle construction principle, and the vehicle damage assessment data and maintenance data are used to carry out scientific and systematic damage assessment pricing for repairing the damaged vehicle. The vehicle damage assessment involves technologies and benefits related to maintenance, manufacturing, and a vehicle owner. It is a prominently contradictory part of the vehicle insurance service. Therefore, the vehicle damage assessment is very important. To facilitate survey and damage assessment of a vehicle, the insurance institution is staffed with vehicle damage assessment personnel; and when a traffic accident occurs to an insured vehicle, the insurance institution dispatches the vehicle damage assessment personnel to the site to survey and assess the loss. Nowadays, the demand of an insurance institution for the vehicle damage assessment personnel is increasing. Therefore, a more efficient vehicle damage assessment solution is needed.

BRIEF SUMMARY

The present specification provides more efficient vehicle damage assessment and loss determination solutions.

The implementations of the present specification provide the following solutions:

Implementations of the present specification provide a vehicle damage assessment method, including: collecting a first video image including an identification of a target vehicle under damage assessment; in response to that the first video image meets the determined requirement for capturing an identification, collecting a second video image including a damage to the target vehicle; and assessing the damage to the target vehicle based on the first video image and the second video image in response to that the second video image meets the determined requirement for capturing a vehicle damage feature.

Optionally, the second video image includes a third video image and a fourth video image, and the collecting the second video image including the damage to the target vehicle, and the second video image meeting the determined requirement for capturing a vehicle damage feature includes: collecting a third video image for determining a damaged part of the target vehicle; in response to that the third video image is useable to determine the damaged part of the target vehicle, collecting a fourth video image for determining a degree of damage of the target vehicle; and in response to that the fourth video image is useable to determine the degree of damage of the target vehicle, determining that the second video image meets the determined requirement for capturing a vehicle damage feature.

Optionally, that the first video image meets the determined requirement for capturing an identification includes: extracting an image feature related to the identification of the target vehicle from the first video image; and in response to that the extracted image feature matches a set vehicle identification feature, determining that the first video image meets the determined requirement for capturing an identification.

Optionally, the vehicle identification features include one of or a combination of at least two of the following: a license plate number, a headlight, a wheel hub, a door handle, a vehicle taillight, a vehicle rearview mirror, a fuel tank cover, and a charging port.

Optionally, before determining that the second video image meets the determined requirement for capturing a vehicle damage feature, the method further includes: sending the second video image to a vehicle damage assessment server, for the vehicle damage assessment server to determine whether the second video image meets the determined requirement for capturing a vehicle damage feature and to obtain a determination result; and receiving the determination result sent by the damage assessment server; and the assessing the damage to the target vehicle based on the first video image and the second video image in response to that the second video image meets the determined requirement for capturing a vehicle damage feature includes: assessing the damage to the target vehicle based on the first video image and the second video image in response to that the determination result indicates that the second video image meets the determined requirement for capturing a vehicle damage feature.

Optionally, that the first video image meets the determined requirement for capturing an identification includes: determining a first region in which the identification of the target vehicle is located from the first video image; filling in the first region with a determined capturing unit, to obtain a second region including the capturing unit; and in response to that the video image in the second region meets the determined requirement for capturing an identification, highlighting the second region to determine that the first video image meets the determined requirement for capturing an identification.

Optionally, that the second video image meets the determined requirement for capturing a vehicle damage feature includes: determining a third region related to the damage to the target vehicle from the second video image; filling in the third region with a determined capturing unit, to obtain a fourth region including the capturing unit; and in response to that the video image in the fourth region meets the determined requirement for capturing a vehicle damage feature, highlighting the fourth region to determine that the second video image meets the determined requirement for capturing a vehicle damage feature.

Optionally, the assessing the damage to the target vehicle based on the first video image and the second video image includes: sending the first video image and the second video image to a vehicle damage assessment server, for the vehicle damage assessment server to assess the damage to the target vehicle based on the first video image and the second video image to obtain a damage assessment result of the target vehicle; and receiving the damage assessment result sent by the damage assessment server.

Implementations of the present specification provide a vehicle damage assessment apparatus, including: a first video collection module, configured to collect a first video image including an identification of a target vehicle under damage assessment; a second video collection module, configured to: in response to that the first video image meets the determined requirement for capturing an identification, collect a second video image including a damage to the target vehicle; and a vehicle damage assessment module, configured to assess the damage to the target vehicle based on the first video image and the second video image in response to that the second video image meets the determined requirement for capturing a vehicle damage feature.

Optionally, the second video image includes a third video image and a fourth video image, and the vehicle damage assessment module includes: a third video acquisition unit, configured to collect a third video image for determining a damaged part of the target vehicle; a fourth video acquisition unit, configured to: in response to that the third video image is useable to determine the damaged part of the target vehicle, collect a fourth video image for determining a degree of damage of the target vehicle; and a determining unit, configured to determine that the second video image meets the determined requirement for capturing a vehicle damage feature in response to that the fourth video image is useable to determine a degree of damage of the target vehicle.

Optionally, the second video collection module includes: a feature extraction unit, configured to extract an image feature related to the identification of the target vehicle from the first video image; and a determining unit, configured to: in response to that the extracted image feature matches a set vehicle identification feature, determine that the first video image meets the determined requirement for capturing an identification.

Optionally, the vehicle identification features include one of or a combination of at least two of the following: a license plate number, a headlight, a wheel hub, a door handle, a vehicle taillight, a vehicle rearview mirror, a fuel tank cover, and a charging port.

Optionally, the apparatus further includes: a video image sending module, configured to send the second video image to a vehicle damage assessment server, for the vehicle damage assessment server to determine whether the second video image meets the determined requirement for capturing a vehicle damage feature and to obtain a determination result; and a determination result receiving module, configured to receive the determination result sent by the damage assessment server; and the vehicle damage assessment module is configured to assess the damage to the target vehicle based on the first video image and the second video image in response to that the determination result indicates that the second video image meets the determined requirement for capturing a vehicle damage feature.

Optionally, the second video collection module includes: a first region determining unit, configured to determine a first region in which the identification of the target vehicle is located from the first video image; a first filling unit, configured to fill in the first region with a determined capturing unit, to obtain a second region including the capturing unit; and a first determining unit, configured to: in response to that the video image in the second region meets the determined requirement for capturing an identification, highlight the second region to determine that the first video image meets the determined requirement for capturing an identification.

Optionally, the vehicle damage assessment module includes: a third region determining unit, configured to determine a third region related to the damage to the target vehicle from the second video image; a second filling unit, configured to fill in the third region with a determined capturing unit, to obtain a fourth region including the capturing unit; and a second determining unit, configured to: in response to that the video image in the fourth region meets the determined requirement for capturing a vehicle damage feature, highlight the fourth region to determine that the second video image meets the determined requirement for capturing a vehicle damage feature.

Optionally, the vehicle damage assessment module includes: a video image sending unit, configured to send the first video image and the second video image to a vehicle damage assessment server, for the vehicle damage assessment server to assess the damage to the target vehicle based on the first video image and the second video image to obtain a damage assessment result of the target vehicle; and a damage assessment result receiving unit, configured to receive the damage assessment result sent by the damage assessment server.

Implementations of the present specification provide a vehicle damage assessment device, including: a processor; and a memory configured to store computer-executable instructions, where when the executable instructions are executed, the processor is enabled to: collect a first video image including an identification of a target vehicle under damage assessment; in response to that the first video image meets the determined requirement for capturing an identification, collect a second video image including a damage to the target vehicle; and assess the damage to the target vehicle based on the first video image and the second video image in response to that the second video image meets the determined requirement for capturing a vehicle damage feature.

It can be seen from the technical solutions provided in the above implementations of the present specification that, in the implementations of the present specification, a first video image including an identification of a target vehicle under damage assessment is collected; in response to that the first video image meets the determined requirement for capturing an identification, a second video image including a damage to the target vehicle is collected; and the damage to the target vehicle is assessed based on the first video image and the second video image in response to that the second video image meets the determined requirement for capturing a vehicle damage feature. In this way, a user only needs to capture the video image of the target vehicle under damage assessment by using a camera device, to assess damage to the target device, and an insurance institution does not to send vehicle damage assessment personnel to the site for survey and damage assessment, so that the insurance institution saves considerable human resources and material resources. In addition, the video images uploaded by users are analyzed by a terminal device or a server, which saves the time required for vehicle damage assessment and improves the efficiency of vehicle damage assessment.

BRIEF DESCRIPTION OF THE DRAWINGS

To describe the technical solutions in the implementations of the present specification or in the existing technology more clearly, the following outlines the accompanying drawings for illustrating such technical solutions. Clearly, the accompanying drawings outlined below are some implementations of the present specification and a person skilled in the art can derive other drawings or implementations from such accompanying drawings without creative efforts.

DETAILED DESCRIPTION

Implementations of the present specification provide a vehicle damage assessment method, apparatus, and device.

To allow a person skilled in the art better understand the technical solutions in the present specification, the following clearly describes the technical solutions in the implementations of the present specification with reference to the accompanying drawings in the implementations of the present specification. Clearly, the described implementations are merely some but not all of the implementations of the present specification. Based on the implementations of the present specification, a person skilled in the art can obtain other implementations without making creative efforts, which all fall within the scope of the present specification.

Figure 1:
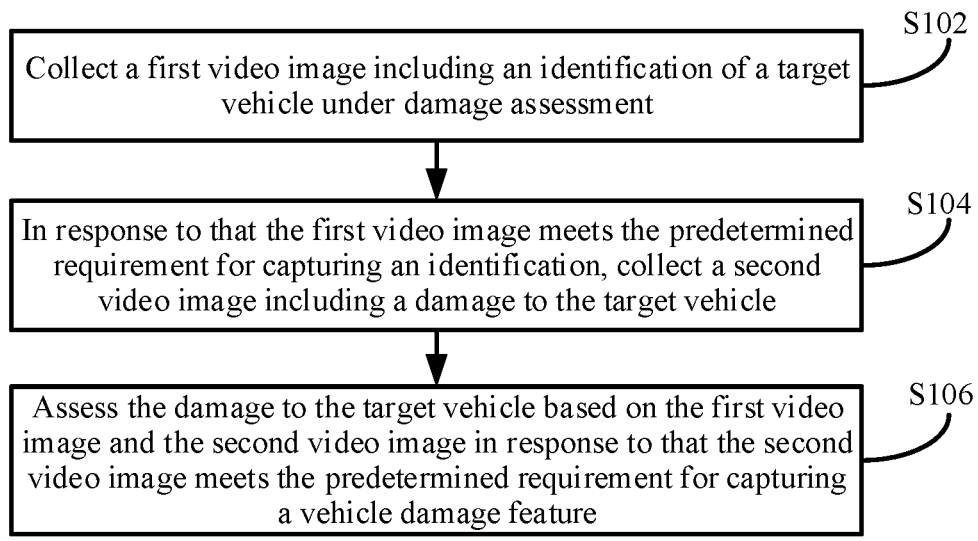
FIG. 1 is an implementation of a vehicle damage assessment method according to the present specification.

As shown in FIG. 1, an implementation of the present specification provides a vehicle damage assessment method. The method can be performed by a terminal device or jointly performed by a terminal device and a server. The terminal device can be a device such as a personal computer, or can be a mobile terminal device such as a mobile phone or a tablet computer. The terminal device can be a terminal device used by a user. The server can be a standalone server or a server cluster, and the server can be a server used for vehicle damage assessment. The method can be used for processing such as vehicle damage assessment. This implementation can specifically include the following steps:

In step S102: a first video image is collected, which includes an identification of a target vehicle under damage assessment.

The target vehicle can be any vehicle that is damaged after a collision involving the vehicle. The identification can be information used for determining an identity of the target vehicle, for example, a license plate number of the target vehicle or an engine number of the target vehicle, etc. The first video image can be a video image captured by a camera device.

During implementation, since the beginning of the 21st century, with the rapid development of the automobile industry, the production volume and sale volume of vehicles and the vehicle population are increasing. With the rapid increase of the number of vehicles, the improvement of roads (especially the increase of expressways and overpasses), and the increase of vehicle speed and the collision damage caused by traffic accidents, the automobile survey and damage assessment, and automobile insurance and compensation industries are also rising. When a traffic accident occurs to an insured vehicle, an insurance organization first needs to make a survey and assess damage to the vehicle. The vehicle damage assessment is a comprehensive analysis of the site of vehicle collision and accident through scientific and systematic professional inspection, testing, and survey means based on the vehicle construction principle, and the vehicle damage assessment data and maintenance data are used to carry out scientific and systematic damage assessment pricing for repairing the damaged vehicle. The vehicle damage assessment involves technologies and benefits related to maintenance, manufacturing, and a vehicle owner. It is a prominently contradictory part of the vehicle insurance service. The survey and damage assessment are performed to determine the damage to the vehicle, including the authenticity of the damage, the actual extent of the damage, and the extent of repair or compensation. To facilitate survey and damage assessment of a vehicle, the insurance institution is staffed with vehicle damage assessment personnel; and when a traffic accident occurs to an insured vehicle, the insurance institution dispatches the vehicle damage assessment personnel to the site to survey and assess the loss. Nowadays, the demand of an insurance institution for the vehicle damage assessment personnel is increasing, and the requirement for the vehicle damage assessment personnel is becoming more and more standardized. Because it takes some time to dispatch the vehicle damage assessment personnel to the site of an accident, and if the vehicle damage assessment personnel of the insurance institution are not enough, the time taken to arrive at the site becomes longer, which results in a low vehicle damage assessment efficiency. To this end, an implementation of the present specification provides a vehicle damage assessment method in which the personnel of the insurance institution do not need to be frequently dispatched and the vehicle damage assessment efficiency can be improved.

When a traffic accident occurs to an insured vehicle (that is, the target vehicle), the reporting person (for example, a vehicle driver or a passenger) is far closer to the target vehicle than the vehicle damage assessment person of the insurance institution. If the reporting person can report information such as the actual information of the target vehicle that meets the damage assessment requirement and the normative evidence required for the damage assessment, the insurance institution does not need to dispatch or arrange vehicle damage assessment personnel to the target vehicle, so that human resources of the insurance institution can be saved, and the efficiency of the damage assessment of the vehicle can also be improved. Therefore, a mechanism for reporting or uploading the damage assessment information of the vehicle can be provided, by which the user can be guided to report standardized vehicle damage information. A possible implementation of the mechanism is described in detail below.

Figure 2A:
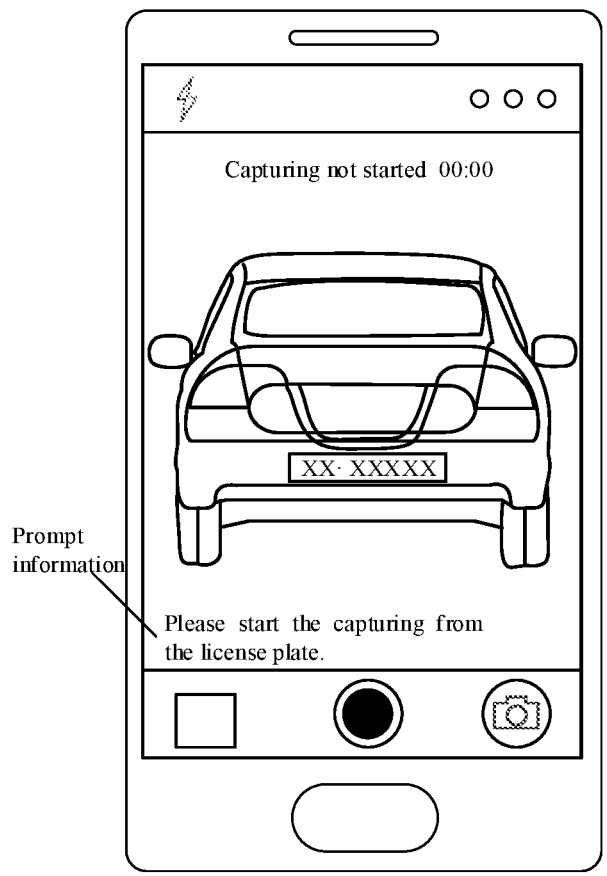
FIG. 2A is a schematic diagram illustrating a video capturing interface in a vehicle damage assessment process according to the present specification.
Figure 2B:
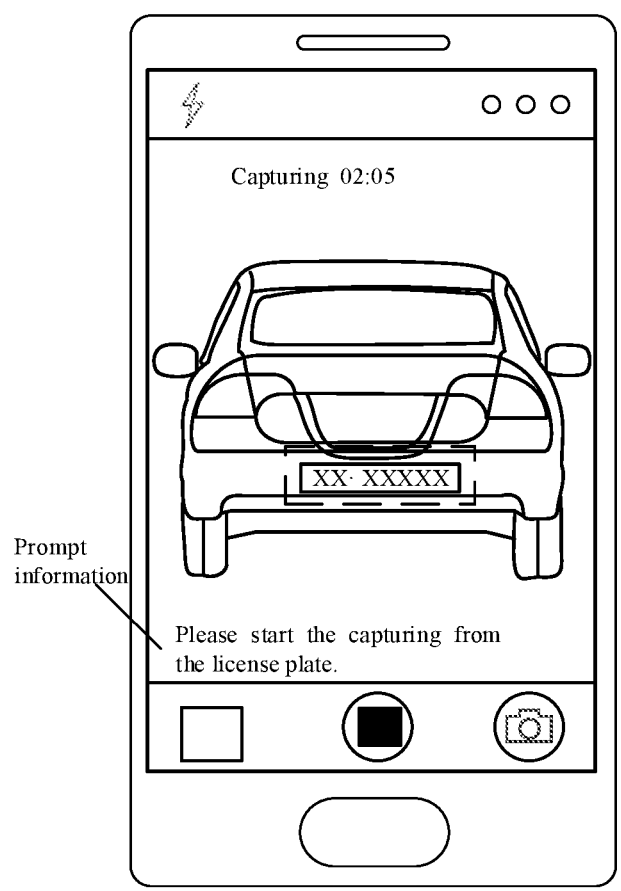
FIG. 2B is a schematic diagram illustrating a video capturing interface when capturing of a video image starts in a vehicle damage assessment process according to the present specification.

First, to ensure that a vehicle is a target vehicle under damage assessment, the user can be instructed to report authentic and effective identity information of the target vehicle so that vehicle damage assessment fraud can be avoided, and the possible risk can be reduced as much as possible. In this implementation of the present specification, to reduce the risk as much as possible, the information related to the vehicle damage assessment can be reported by using video images. A trigger button of the vehicle damage assessment information reporting mechanism can be provided on a terminal device of a user. In addition, a corresponding application program can be written by using a computer programming language based on the vehicle damage assessment information reporting mechanism. When the user needs to report the damage condition of the vehicle to the insurance institution, the user can click the trigger button of the vehicle damage assessment information reporting mechanism, or start the corresponding application program to trigger execution of the vehicle damage assessment information reporting mechanism. The terminal device can execute the vehicle damage assessment information reporting mechanism. In this case, as shown in FIG. 2A, the terminal device can start the camera, enable the video capturing function, and capture a video image through the camera. In this case, the display interface of the terminal device can provide corresponding prompt information, so that the user can perform corresponding operations. The prompt information can be used to prompt the user to capture an identification of a target vehicle, etc., so that the terminal device can capture a first video image including the identification of the target vehicle under damage assessment. For example, the prompt information is used to prompt the user to capture the license plate number of the target vehicle. Thus, as shown in FIG. 2A and FIG. 2B, the user can align the camera of the terminal device to the license plate number of the target vehicle to obtain the first video image. In practice, if the identification is a license plate number, a rectangular region can be provided on the camera preview interface of the terminal device. When the license plate number is captured, the user can be prompted to place the image of the license plate number in the rectangular region to facilitate subsequent identification of the license plate number. Alternatively or additionally, the program, installed on a terminal device or on a server, may also automatically identify a vehicle identification feature, e.g., license plate on a vehicle, and controls a camera lens to align to and focus on the vehicle identification feature. For example, the program may be trained, in deep learning, to identify a license plate of a vehicle from a frontal image of a vehicle. As such, a person does not need to specifically align the camera lens to point to the license plate and can roughly point a camera toward a vehicle under assessment and the program will automatically take a series of images of the vehicle to identify a location of the license plate to control the lens to point to the license plate and take further images of the license plate.

In step S104, in response to that the first video image meets the determined requirement for capturing an identification, a second video image is collected, which includes damage to the target vehicle. The second video image can be a video image that includes a target vehicle damage condition that is captured by a camera device, where the target vehicle damage condition can include a damaged position, a degree of damage, etc.

The step S104 includes a sub-step of determining whether the first video image meets the determined requirement/ threshold for capturing a vehicle identification. This sub-step may be performed by the terminal device, the server or a combination of the terminal device and the server. The predetermined requirement for capturing a vehicle identification can be set based on the actual situation. For example, if the identification is a license plate number, the predetermined requirement for capturing an identification can be a feature of the license plate number, and can include: a relatively regular rectangle, or a parallelogram in the case of non-planar capturing, a white word with a blue background or a black word with a yellow background, a combination of letter, number and color design, e.g., Chinese+white dot+5-letter English word and/or a number, etc.

During implementation, when the user uses the terminal device to capture the target vehicle identification, the terminal device can perform image analysis on the captured first video image, that is, can calculate the target region of the captured target vehicle in the video window in real time, capture the combination of the display units, and fill in the area of the target region, so as to capture the feature corresponding to the identification in the first video image, lock the corresponding region, and further identify the region to determine whether the first video image meets the predetermined requirement for capturing an identification.

For example, if the identification is a license plate number, the terminal device can perform image analysis on the captured first video image, that is, can calculate in real time a target region of the target vehicle that is captured in the video window and that matches the relative regular rectangle of the license plate number, capture the combination of the display units, and fill in the area of the target region, to capture a feature that matches the feature relatively in the first video image, lock the corresponding regular rectangular region, and further identify the regular rectangular region, that is, determine whether the word in the regular rectangular region is a white word with a blue background or a black word with a yellow background, and determine whether the regular rectangular region includes a combination of letter, number and color design, e.g., Chinese+white dot+5-letter English word and/or a number, so as to determine whether the first video image meets the predetermined requirement for capturing an identification. If the word in the regular rectangular region is a white word with a blue background or a black word with a yellow background, and the regular rectangular region includes a combination of Chinese+white dot+5-letter English word and/or a number, it is determined that the first video image meets the predetermined requirement for capturing an identification; otherwise, it is determined that the first video image does not meet the predetermined requirement for capturing an identification. Whether the first video image meets the predetermined requirement for capturing an identification can be determined in many intuitive ways. For example, color-changing processing can be performed on the target region; that is, if it is determined that the first video image meets the predetermined requirement for capturing an identification, the regular rectangular region can be changed from gray to red, so that the user can know in time whether the captured video image meets the specification or requirement.

Figure 2C:
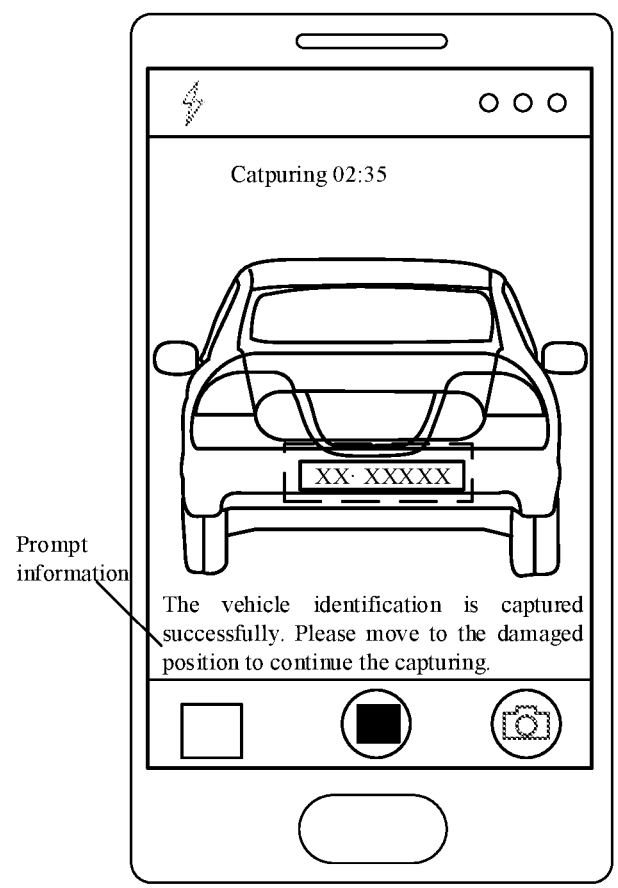
FIG. 2C is a schematic diagram of a video capturing interface displayed when a next capturing step starts after a previous capturing step is finished.

If the first video image meets the determined requirement for capturing an identification, the terminal device can display the prompt information of the next step. In this case, as shown in FIG. 2C, the prompt information of the next step can be provided on the display interface of the terminal device. Based on the prompt information, the user can capture the corresponding video image, where the prompt information can be used to prompt the user to capture the damage condition of the target vehicle, etc. Thus, the terminal device can obtain the second video image including the damaged position and the degree of damage of the target vehicle. Alternatively or additionally, the program may also automatically identify a position of damage to the vehicle.

For example, the program may be trained, in deep learning, to identify an abnormity or a damaged portion on a body of a vehicle from an image of the vehicle. For example, surface roughness, color discontinuity, shades, and other image characteristics related to a damage may be used by the program to identify a position of a damage to the vehicle. For example, the program will automatically take a series of images of the vehicle to identify a position of the damage and to take further images of the damage. In some implementations, a user and the program, e.g., AI based program, may work together to identify the vehicle identification and/or the damaged portion. For example, a remote user may work with a drone to examine, inspect or appraise a vehicle involved in an accident. The drone may function as a terminal device and may take images of the vehicle identification and the damaged portion automatically using AI, under control by the remote user, or directed by a combination of user control and AI.

In step S106, the damage to the target vehicle is assessed based on the first video image and the second video image in response to that the second video image meets a determined requirement/threshold, predetermined or dynamically determined, for capturing a vehicle damage feature.

In some implementations, the step S106 includes a sub-step of determining whether the second video image meets the determined requirement for capturing a vehicle damage feature. This sub-step may be conducted by the terminal device, a server or a combination of a terminal device and a server. The requirement for capturing a vehicle damage feature can be set based on the actual situation. For example, a body damage may require that the second video is capable of showing a part of the vehicle body that is damaged. Damage to an internal mechanical/electrical part may also require showing of the functional issues of the damaged mechanical/electrical part. For example, for damage to a bumper of a vehicle, the second video image may be required to show whether the driver-assistance system integrated in the bumper, such as backup camera/sensors, front/side camera/sensor or distance alert sensors, is damaged. For example, if the identification is a license plate number, the requirement for capturing an identification can be a feature of the license plate number, and can include: a relatively regular rectangle (or a parallelogram in the case of non-planar capturing), a white word with a blue background or a black word with a yellow background, a combination of Chinese+white dot+5-letter English word and/or a number, etc.

During implementation, when the user uses the terminal device to capture a second video image related to the damage to the target vehicle, the terminal device can perform image analysis on the captured second video image, e.g., can calculate the target region of the captured target vehicle in the video window in real time, capture the combination of the display units, and fill in the area of the target region, so as to capture the feature corresponding to the identification existing in the second video image, lock the corresponding region, and further identify and determine whether the second video image meets the determined requirement for capturing an identification. Whether the second video image meets the determined requirement for capturing a vehicle damage feature can be determined in many intuitive ways. For example, color-changing processing can be performed on the target region.

If the second video image meets the determined requirement for capturing a vehicle damage feature, the terminal device can prompt the user that the current capturing has been completed. If the user instructs to continue capturing, the terminal device can perform video image capturing as described in step S104 and step S106. If the user instructs to end capturing, the terminal device can obtain the first video image and the second video image, and can perform image analysis on the first video image and the second video image, respectively, to determine the damaged parts of the target vehicle and the degree of damage, so as to formulate a repair scheme, a repair price, a vehicle insurance compensation suggestion, etc., thereby achieving the purpose of damage assessment of the target vehicle.

It is worthwhile to note that the damage assessment of a target vehicle can be performed by the terminal device, or can be performed by a server. When the damage assessment of a target vehicle is performed by a server, after obtaining the first video image and the second video image, the terminal device can send the first video image and the second video image to the vehicle damage assessment server. After receiving the first video image and the second video image, the vehicle damage assessment server can perform video analysis on the first video image and the second video image, to determine the damaged parts of the target vehicle and the degree of damage, so as to formulate a repair scheme, a repair price, a vehicle insurance compensation suggestion, etc. Then, the terminal device can send the vehicle damage assessment result to the terminal device, thereby reducing the data processing pressure of the terminal device and improving the data processing efficiency.

According to the vehicle damage assessment method provided in this implementation of the present specification, a first video image including an identification of a target vehicle under damage assessment is collected; in response to that the first video image meets the determined requirement for capturing an identification, a second video image including a damage to the target vehicle is collected; and the damage to the target vehicle is assessed based on the first video image and the second video image in response to that the second video image meets the determined requirement for capturing a vehicle damage feature. In this way, a user only needs to capture the video image of the target vehicle under damage assessment by using a camera device, to assess damage to the target device, and an insurance institution does not to send vehicle damage assessment personnel to the site for survey and damage assessment, so that the insurance institution saves considerable human resources and material resources. In addition, the video images uploaded by users are analyzed by a terminal device or a server, which saves the time required for vehicle damage assessment and improves the efficiency of vehicle damage assessment.

Figure 3:
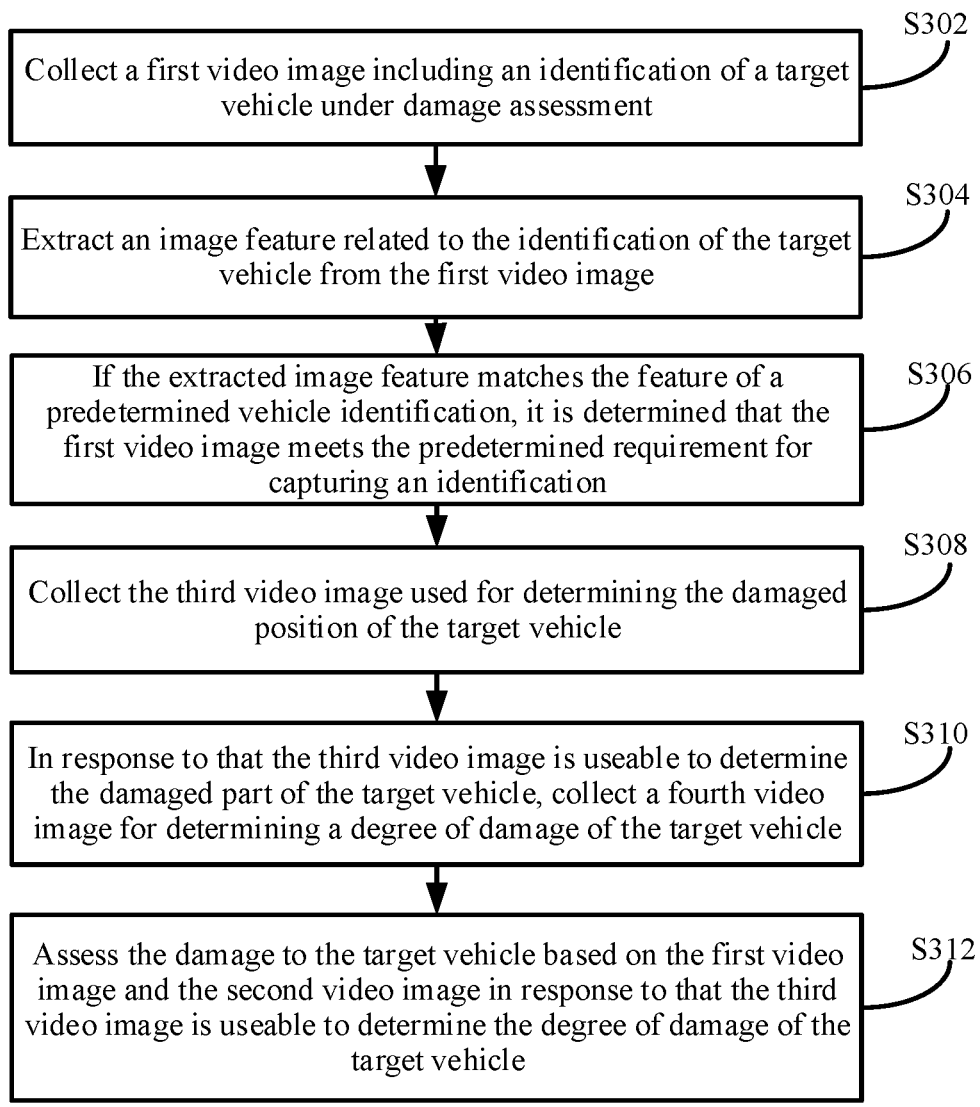
FIG. 3 is another implementation of a vehicle damage assessment method according to the present specification.

As shown in FIG. 3, an implementation of the present specification provides a vehicle damage assessment method. The method can be performed by a terminal device. The terminal device can be a device such as a personal computer, or can be a mobile terminal device such as a mobile phone or a tablet computer. The terminal device can be a terminal device used by a user. The terminal device can be physically together with the user or may be controlled by a remote user, e.g., the terminal device may be a drone having a processing capacity and a storage device storing a program for vehicle damage inspection. The method can be used for processing such as vehicle damage assessment. This implementation can specifically include the following steps:

In step S302, a first video image is collected, which includes an identification of a target vehicle under damage assessment.

The vehicle identification features include one of or a combination of at least two of the following: a license plate number, a headlight, a wheel hub, a door handle, a vehicle taillight, a vehicle rearview mirror, a fuel tank cover, and a charging port. In practice, the vehicle identification features are not limited to the above, and can also include other information that can be used to prove the identity of the target vehicle, for example, an engine number or a vehicle identification number (VIN).

The content of the step S302 is the same as the content of the step S102 in the first implementation. For details about the step S302, refer to the related content of the step S102 in the first implementation. Details are omitted here for simplicity.

In step 304, an image feature related to the identification of the target vehicle is extracted from the first video image.

During implementation, a video image feature extraction algorithm can be provided in the terminal device, and the feature extraction algorithm can be used to extract feature information of the video image. After the terminal device obtains the first video image in step S302, a determined feature extraction algorithm can be invoked to analyze the first video image, so as to extract feature information from the first video image. Then, image features related to the identification of the target vehicle can be extracted from the extracted feature information based on the identification information of the target vehicle.

In step S306, if the extracted image feature matches the feature of a determined vehicle identification, it is determined that the first video image meets the determined requirement for capturing an identification.

During implementation, a vehicle feature library can be stored in the terminal device, and features of a vehicle identification can be stored in the feature library. Specifically, the feature library can store related features of a license plate, related features of a headlight, related features of a wheel hub, related features of a door handle, related features of a vehicle taillight, related features of a vehicle rearview mirror, related features of a fuel tank cover, related features of a charging port, etc. The related features of the license plate number include: a relatively regular rectangle (or a parallelogram in the case of non-planar capturing), a white word with a blue background or a black word with a yellow background, a combination of letter, number and color design, e.g., Chinese+white dot+5-letter English word and/or a number, etc. The related features of the headlight, the wheel hub, the door handle, the vehicle taillight, the vehicle rearview mirror, the fuel tank cover, or the charging port can include: appearance style features, internal structure style features, etc.

After the terminal device extracts the image features of the first video image in step S304, the extracted image features can be matched with the vehicle identification features that are stored in the feature library. If the extracted image features do not match the vehicle identification features that are stored in the feature library, it indicates that the first video image captured by the user does not meet the specification or requirement. In this case, the terminal device can output prompt information to prompt the user to re-capture the video image. If the extracted image features match the vehicle identification features that are stored in the feature library, it indicates that the first video image captured by the user meets the specification or requirement. In this case, the terminal device can store the first video image.

In practice, the process of determining whether the first video image meets the determined requirement for capturing an identification can be implemented in many ways. An alternative processing method is provided below. The method can specifically include the following steps 1 to 3.

In step 1, a first region is determined, in which the identification of the target vehicle is located from the first video image.

During implementation, the first region can be determined based on related features of an identification of the target vehicle. For the identification of the target vehicle, references can be made to the related content described above. For example, if the identification of the target vehicle is a license plate number, the first region can be a region of a license plate with the license plate number; and for related features of the license plate, references can be made to the related content described above. That is, the related features of the license plate can include: a relatively regular rectangle, a white word with a blue background or a black word with a yellow background, a combination of letter, number and color design, e.g., Chinese+white dot+5-letter English word and/or a number, etc. Therefore, the region with the previously described features can be searched in the first video image, and the above region can be determined as the first region, and the first region can include the identification of the target vehicle.

In step 2, the first region is filled with determined capturing unit, predetermined or dynamically determined, to obtain a second region including the capturing unit.

The determined capturing unit can be a basic composition unit of image capturing. The size of the capturing unit can be set based on an actual condition. For example, the capturing unit can be a square, and the side length of the square can be 1 mm or a length of one or more pixels. The capturing unit is also referred to as a patching unit, patch or a pixel unit.

Figure 2D:
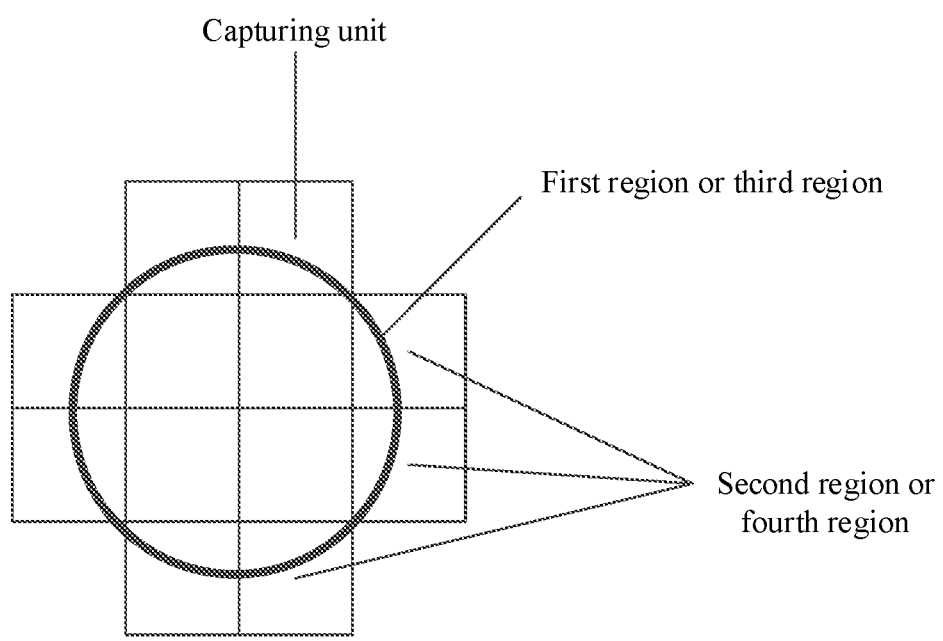
FIG. 2D is a schematic diagram illustrating filling of a first region or a third region in a vehicle damage assessment process according to the present specification.

During implementation, after step 1 is performed, the first region with the related features of the identification of the target vehicle captured in the video window can be calculated in real time and the shape of the first region can be determined. Then, as shown in FIG. 2D, the area delineated by the first region can be filled in with the capturing unit based on the shape of the first region until the region filled by the plurality of capturing units covers the first region, where there is no overlapping between any two of the plurality of capturing units. Finally, a second region including the capturing unit can be obtained.

In step 3, in response to that the video image in the second region meets the determined requirement for capturing an identification, the second region is highlighted to indicate that the first video image meets the determined requirement for capturing an identification.

During implementation, after the image features of the video image in the second region are extracted in step S304, the extracted image features can be matched with the vehicle identification features that are stored in the feature library. If the extracted image features do not match the vehicle identification features that are stored in the feature library, it indicates that the first video image captured by the user does not meet the specification or requirement. In this case, prompt information can be output to prompt the user to re-capture the video image. If the extracted image features match the vehicle identification features that are stored in the feature library, the second region can be highlighted to indicate that the first video image captured by the user meets the specification or requirement, so as to indicate that the video image captured by the user meets the requirements in time. The second region can be highlighted in many ways. For example, a color of the second region can be changed, for example, changed from blue to red; or the second region can be displayed in a blinking way.

As shown in FIG. 2C, after the identity of the target vehicle is determined in the above way, the user can be instructed to perform the next processing step by, for example, changing from an inoperable key or arrow to an operable key or arrow, or directly unlocking the next processing step, e.g., to request the user to capture a related video image of the vehicle damage condition. Considering that the determination of the vehicle damage condition usually includes two parts, e.g., determining the damage position of the vehicle and determining the degree of the damage, the damage condition of the target vehicle can be determined through the following step S308 and step S310.

In step S308, the third video image is collected and used for determining the damaged position of the target vehicle.

During implementation, the terminal device can display the instruction information that is used for instructing the user to capture a video of the damaged part of the vehicle, and the user can align the camera of the terminal device to the damaged part of the target vehicle based on the content of the instruction information, and perform video capturing. When the user captures a third video image related to a damaged position of the target vehicle, the terminal device can calculate the target region of the captured target vehicle in the video window in real time, capture the combination of the display units, and fill in the area of the target region, so as to capture the third video image corresponding to the entire damaged position and then lock the target region.

In step S310, in response to that the third video image is useable to determine the damaged part of the target vehicle, a fourth video image is collected for determining a degree of damage of the target vehicle.

During implementation, after obtaining the third video image including the damaged position of the target vehicle in step S308, the terminal device can analyze the third video image, extract the feature information from the third video image, extract the image feature related to the damaged position of the target vehicle from the extracted feature information based on the related information of each portion of the target vehicle, and determine the damaged position of the target vehicle based on the extracted image feature. If the terminal device can determine the damaged part of the damaged position of the target vehicle based on the extracted image feature, the user can be instructed to perform the next processing step, for example, changing from an inoperable key or arrow to an operable key or arrow, or directly unlocking the next processing step, to request the user to capture a related video image of the vehicle degree of damage. In this case, the terminal device can display the instruction information that is used for instructing the user to capture a video of the damaged part of the vehicle, and the user can align the camera of the terminal device to the damaged part of the target vehicle based on the content of the instruction information, and perform video capturing. When the user captures a fourth video image related to a degree of damage of the target vehicle, the terminal device can calculate the target region of the captured target vehicle in the video window in real time, capture the combination of the display units, and fill in the area of the target region, so as to capture the fourth video image corresponding to the degree of damage of the target vehicle.

In step S312, the damage to the target vehicle is assessed based on the first video image and the second video image in response to that the third video image is useable to determine the degree of damage of the target vehicle.

The second video image can include a third video image and a fourth video image.

During implementation, after obtaining the fourth video image including the degree of damage of the target vehicle in step S310, the terminal device can analyze the fourth video image, extract the feature information from the fourth video image, extract the image feature related to the degree of damage of the target vehicle from the extracted feature information based on the related information of each part of the target vehicle, and determine the degree of damage of the target vehicle based on the extracted image feature. If the terminal device can determine the degree of damage of the damaged part based on the extracted image feature, the terminal device can determine the degree of damage of the target vehicle based on the first video image and the second video image. For the process of assessing the damage to the vehicle, references can be made to the related content in step S106 in the first implementation. Details are omitted here for simplicity.

In practice, the process of determining whether the second video image meets the determined requirement for capturing a vehicle damage feature can be implemented in many ways. An alternative processing method is provided below. As shown in FIG. 2D, the method can specifically include the following steps 1 to 3.

In step 1, a third region related to the damage to the target vehicle is determined from the second video image.

In step 2, the third region is filled in with a determined capturing unit, to obtain a fourth region including the capturing unit.

In step 3, in response to that the video image in the fourth region meets the determined requirement for capturing a vehicle damage feature, the fourth region is highlighted to indicate that the second video image meets the determined requirement for capturing a vehicle damage feature.

For the specific processing procedures of steps 1 to 3, references can be made to the above related content. Details are omitted here for simplicity. It is worthwhile to note that, if the second video image includes the third video image and the fourth video image, the third video image is useable to determine the damaged portion of the target vehicle, and based on steps 1 to 3, the first sub-region in which the damaged portion of the target vehicle is located is determined from the third video image; the first sub-region can be filled in with a determined capturing unit to obtain a second sub-region including the capturing unit; and in response to that the video image in the second sub-region is useable to determine the damaged portion of the target vehicle, the second sub-region is highlighted to determine that the third video image is useable to determine the damaged portion of the target vehicle. The fourth video image is useable to determine the degree of damage of the target vehicle, and based on the steps 1 to 3, a third sub-region related to the degree of damage of the target vehicle is determined from the fourth video image; the third sub-region is filled in with a determined capturing unit, to obtain a fourth sub-region including the capturing unit; and in response to that the video image in the fourth sub-region is useable to determine the degree of damage of the target vehicle, the fourth sub-region is highlighted to determine that the fourth video image is useable to determine the damaged portion of the target vehicle. The third region can include a first sub-region and a third sub-region. The fourth region can include a second sub-region and a fourth sub-region.

It is worthwhile to note that whether the second video image meets the determined requirement for capturing a vehicle damage feature is determined by the terminal device. In practice, to reduce the processing pressure of the terminal device, whether the second video image meets the determined requirement for capturing a vehicle damage feature can be performed by the server, and the corresponding processing can include the following steps:

In step 1, the second video image is sent to the vehicle damage assessment server, for the vehicle damage assessment server to determine whether the second video image meets the determined requirement for capturing a vehicle damage feature and to obtain a determination result.

During implementation, if the second video image includes the third video image and the fourth video image, step 1 can further include collecting the third video image used for determining the damaged position of the target vehicle in response to that the first video image meets the determined requirement of the shooting identification; sending the third video image to the vehicle damage assessment server, for the vehicle damage assessment server to determine whether the third video image is useable to determine the damaged position of the target vehicle to obtain a determination result, and the vehicle damage assessment server can send the determination result to the terminal device. If the determination result indicates that the third video image is useable to determine the damaged position of the target vehicle, the terminal device collects the fourth video image used for determining the degree of damage of the target vehicle, and sends the fourth video image to the vehicle damage assessment damage server, for the vehicle damage assessment damage server to determine whether the fourth video image is useable to determine the degree of damage of the target vehicle, to obtain the determination result, and the vehicle damage assessment damage server can send the determination result to the terminal device. For details about determining whether the third video image is useable to determine the damaged position of the target vehicle and whether the fourth video image is useable to determine the degree of damage of the target vehicle, references can be made to the above related content. Details are omitted here for simplicity.

In step 2, the determination result sent by the damage assessment server is received at the terminal device.

Based on step 1 and step 2, step S312 can include assessing the damage to the target vehicle based on the first video image and the second video image in response to that the determination result indicates that the second video image meets the determined requirement for capturing a vehicle damage feature.

According to the vehicle damage assessment method provided in this implementation of the present specification, a first video image including an identification of a target vehicle under damage assessment is collected; in response to that the first video image meets the determined requirement for capturing an identification, a second video image including a damage to the target vehicle is collected; and the damage to the target vehicle is assessed based on the first video image and the second video image in response to that the second video image meets the determined requirement for capturing a vehicle damage feature. In this way, a user only needs to capture the video image of the target vehicle under damage assessment by using a camera device, to assess damage to the target device, and an insurance institution does not to send vehicle damage assessment personnel to the site for survey and damage assessment, so that the insurance institution saves considerable human resources and material resources. In addition, the video images uploaded by users are analyzed by a terminal device or a server, which saves the time required for vehicle damage assessment and improves the efficiency of vehicle damage assessment.

Figure 4:
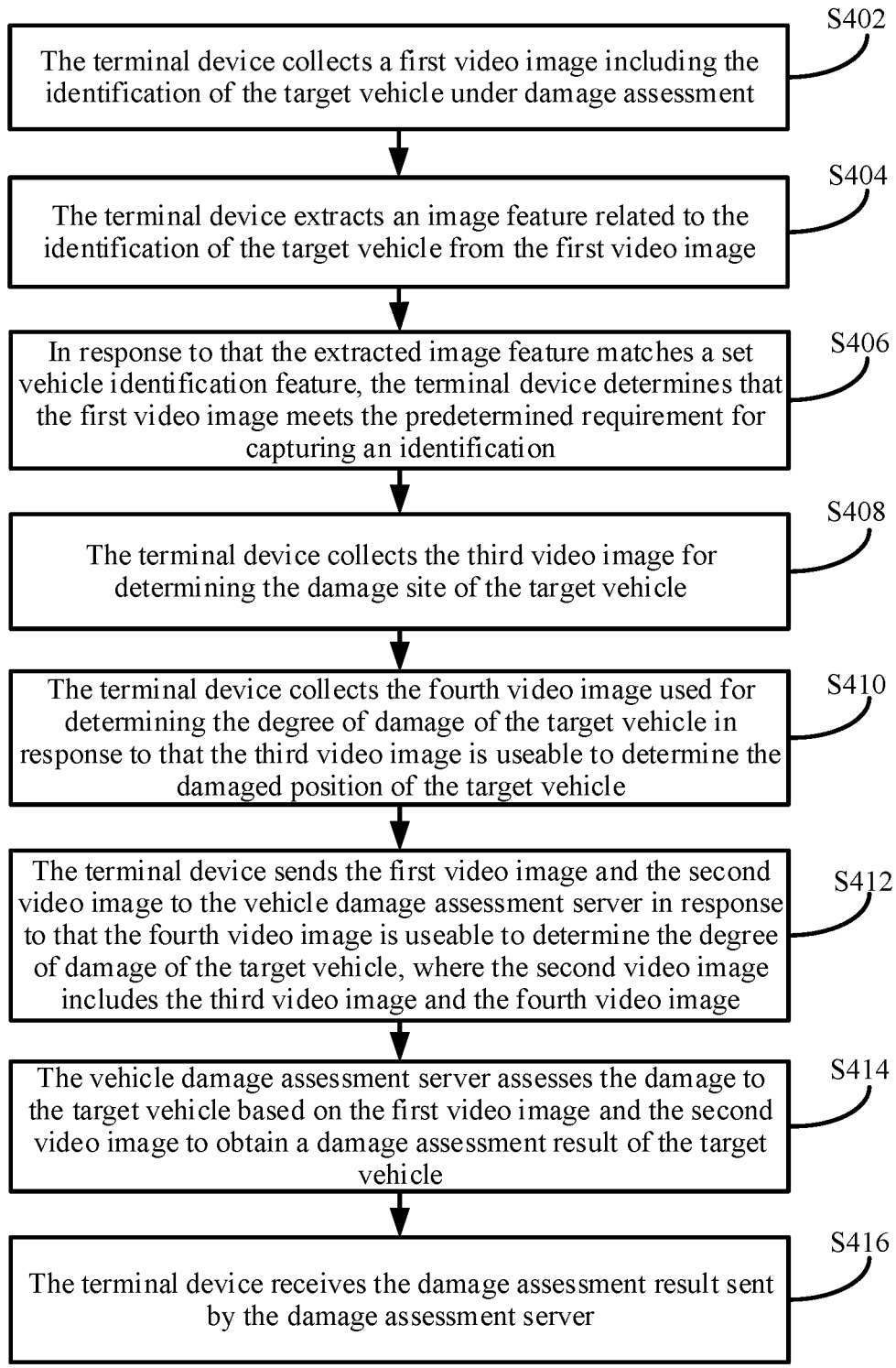
FIG. 4 is still another implementation of a vehicle damage assessment method according to the present specification.

As shown in FIG. 4, an implementation of the present specification provides a vehicle damage assessment method. The method can be performed by a terminal device or a vehicle damage assessment server. The terminal device can be a device such as a personal computer, or can be a mobile terminal device such as a mobile phone or a tablet computer. The terminal device can be a terminal device used by a user. The server can be a standalone server or a server cluster, and the server can be a server used for vehicle damage assessment. The method can be used for processing such as vehicle damage assessment. This implementation can specifically include the following steps:

In step S402, the terminal device collects a first video image including the identification of the target vehicle under damage assessment.

The vehicle identification features include one of or a combination of at least two of the following: a license plate number, a headlight, a wheel hub, a door handle, a vehicle taillight, a vehicle rearview mirror, a fuel tank cover, and a charging port In step S404, the terminal device extracts an image feature related to the identification of the target vehicle from the first video image.

In step S406, in response to that the extracted image feature matches a preset vehicle identification feature, the terminal device determines that the first video image meets the determined requirement for capturing an identification.

For the processing in steps S402 to S406, references can be made to the related content of steps S302 to S306 in the second implementation. Details are omitted here for simplicity.

In step S408, the terminal device collects the third video image for determining the damage site of the target vehicle.

In step S410, the terminal device collects the fourth video image used for determining the degree of damage of the target vehicle in response to that the third video image is useable to determine the damaged position of the target vehicle.

For the processing in step S408 and step S410, references can be made to the related content of step S308 and step S310 in the second implementation. Details are omitted here for simplicity.

To reduce the processing pressure of the terminal device, the damage assessment can be performed by the server (that is, the vehicle damage assessment server). For details, references can be made to the processing in steps S412 to S416 described below.

In step S412, the terminal device sends the first video image and the second video image to the vehicle damage assessment server in response to that the fourth video image is useable to determine the degree of damage of the target vehicle, where the second video image includes the third video image and the fourth video image.

It is worthwhile to note that whether the second video image meets the determined requirement for capturing a vehicle damage feature may be determined by the terminal device. In practice, to reduce the processing pressure of the terminal device, whether the second video image meets the determined requirement for capturing a vehicle damage feature can also be determined by the server, and the corresponding processing can include the following steps.

In step 1, the second video image is sent to the vehicle damage assessment server, for the vehicle damage assessment server to determine whether the second video image meets the determined requirement for capturing a vehicle damage feature and to obtain a determination result.

During implementation, if the second video image includes the third video image and the fourth video image, step 1 can further include collecting the third video image used for determining the damaged position of the target vehicle in response to that the first video image meets the determined requirement of the shooting identification; sending the third video image to the vehicle damage assessment server, for the vehicle damage assessment server to determine whether the third video image is useable to determine the damaged position of the target vehicle to obtain a determination result, and the vehicle damage assessment server can send the determination result to the terminal device. If the determination result indicates that the third video image is useable to determine the damaged position of the target vehicle, the terminal device collects the fourth video image used for determining the degree of damage of the target vehicle, and sends the fourth video image to the vehicle damage assessment damage server, for the vehicle damage assessment damage server to determine whether the fourth video image is useable to determine the degree of damage of the target vehicle, to obtain the determination result, and the vehicle damage assessment damage server can send the determination result to the terminal device.

In step 2, the determination result sent by the damage assessment server is received.

Based on step 1 and step 2, step S412 can be: the terminal device sends the first video image and the second video image to the vehicle damage assessment server in response to that the determination result indicates that the second video image meets the determined requirement for capturing a vehicle damage feature.

In step S414, the vehicle damage assessment server assesses the damage to the target vehicle based on the first video image and the second video image to obtain a damage assessment result of the target vehicle.

During implementation, after receiving the first video image and the second video image (including the third video image and the fourth video image), the vehicle damage assessment server can perform video analysis on the first video image and the second video image, to determine the damaged parts of the target vehicle and the degree of damage, so as to formulate a repair scheme, a repair price, a vehicle insurance compensation suggestion, etc., thereby improving the data processing efficiency.

In step S416, the terminal device receives the damage assessment result sent by the damage assessment server.

According to the vehicle damage assessment method provided in this implementation of the present specification, a first video image including an identification of a target vehicle under damage assessment is collected; in response to that the first video image meets the determined requirement for capturing an identification, a second video image including a damage to the target vehicle is collected; and the damage to the target vehicle is assessed based on the first video image and the second video image in response to that the second video image meets the determined requirement for capturing a vehicle damage feature. In this way, a user only needs to capture the video image of the target vehicle under damage assessment by using a camera device, to assess damage to the target device, and an insurance institution does not to send vehicle damage assessment personnel to the site for survey and damage assessment, so that the insurance institution saves considerable human resources and material resources. In addition, the video images uploaded by users are analyzed by a terminal device or a server, which saves the time required for vehicle damage assessment and improves the efficiency of vehicle damage assessment.

Figure 5:
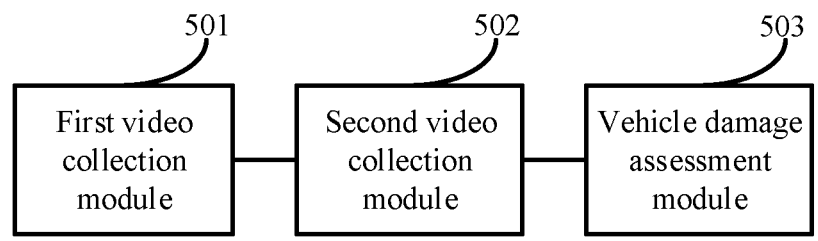
FIG. 5 is another implementation of a vehicle damage assessment apparatus according to the present specification.

The foregoing has described the vehicle damage assessment methods provided in the implementations of the present specification. Based on the same idea, an implementation of the present specification further provides a vehicle damage assessment apparatus, as shown in FIG. 5.

The vehicle damage assessment apparatus includes: a first video collection module 501, configured to collect a first video image including an identification of a target vehicle under damage assessment; a second video collection module 502, configured to: in response to that the first video image meets the determined requirement for capturing an identification, collect a second video image including a damage to the target vehicle; and a vehicle damage assessment module 503, configured to assess the damage to the target vehicle based on the first video image and the second video image in response to that the second video image meets the determined requirement for capturing a vehicle damage feature.

In this implementation of the present specification, the second video image includes a third video image and a fourth video image, and the vehicle damage assessment module 503 includes: a third video acquisition unit, configured to collect a third video image for determining a damaged part of the target vehicle; a fourth video acquisition unit, configured to: in response to that the third video image is useable to determine the damaged part of the target vehicle, collect a fourth video image for determining a degree of damage of the target vehicle; and a determining unit, configured to: in response to that the fourth video image is useable to determine the degree of damage of the target vehicle, determine that the second video image meets the determined requirement for capturing a vehicle damage feature.

In this implementation of the present specification, the second video collection module 502 includes: a feature extraction unit, configured to extract an image feature related to the identification of the target vehicle from the first video image; and a determining unit, configured to: in response to that the extracted image feature matches a set vehicle identification feature, determine that the first video image meets the determined requirement for capturing an identification.

In this implementation of the present specification, the vehicle identification features include one of or a combination of at least two of the following: a license plate number, a headlight, a wheel hub, a door handle, a vehicle taillight, a vehicle rearview mirror, a fuel tank cover, and a charging port.

In this implementation of the present specification, the apparatus further includes: a video image sending module, configured to send the second video image to a vehicle damage assessment server, for the vehicle damage assessment server to determine whether the second video image meets the determined requirement for capturing a vehicle damage feature and to obtain a determination result; and a determination result receiving module, configured to receive the determination result sent by the damage assessment server; and the vehicle damage assessment module is configured to assess the damage to the target vehicle based on the first video image and the second video image in response to that the determination result indicates that the second video image meets the determined requirement for capturing a vehicle damage feature.

In this implementation of the present specification, the second video collection module 502 includes: a first region determining unit, configured to determine a first region in which the identification of the target vehicle is located from the first video image; a first filling unit, configured to fill in the first region with a determined capturing unit, to obtain a second region including the capturing unit; and a first determining unit, configured to: in response to that the video image in the second region meets the determined requirement for capturing an identification, highlight the second region to determine that the first video image meets the determined requirement for capturing an identification.

In this implementation of the present specification, the vehicle damage assessment module 503 includes: a third region determining unit, configured to determine a third region related to the damage to the target vehicle from the second video image; a second filling unit, configured to fill in the third region with a determined capturing unit, to obtain a fourth region including the capturing unit; and a second determining unit, configured to: in response to that the video image in the fourth region meets the determined requirement for capturing a vehicle damage feature, highlight the fourth region to determine that the second video image meets the determined requirement for capturing a vehicle damage feature.

In this implementation of the present specification, the vehicle damage assessment module 503 includes: a video image sending unit, configured to send the first video image and the second video image to a vehicle damage assessment server, for the vehicle damage assessment server to assess the damage to the target vehicle based on the first video image and the second video image to obtain a damage assessment result of the target vehicle; and a damage assessment result receiving unit, configured to receive the damage assessment result sent by the damage assessment server.

According to the vehicle damage assessment apparatus provided in this implementation of the present specification, a first video image including an identification of a target vehicle under damage assessment is collected; in response to that the first video image meets the determined requirement for capturing an identification, a second video image including a damage to the target vehicle is collected; and the damage to the target vehicle is assessed based on the first video image and the second video image in response to that the second video image meets the determined requirement for capturing a vehicle damage feature. In this way, a user only needs to capture the video image of the target vehicle under damage assessment by using a camera device, to assess damage to the target device, and an insurance institution does not to send vehicle damage assessment personnel to the site for survey and damage assessment, so that the insurance institution saves considerable human resources and material resources. In addition, the video images uploaded by users are analyzed by a terminal device or a server, which saves the time required for vehicle damage assessment and improves the efficiency of vehicle damage assessment.

Figure 6:
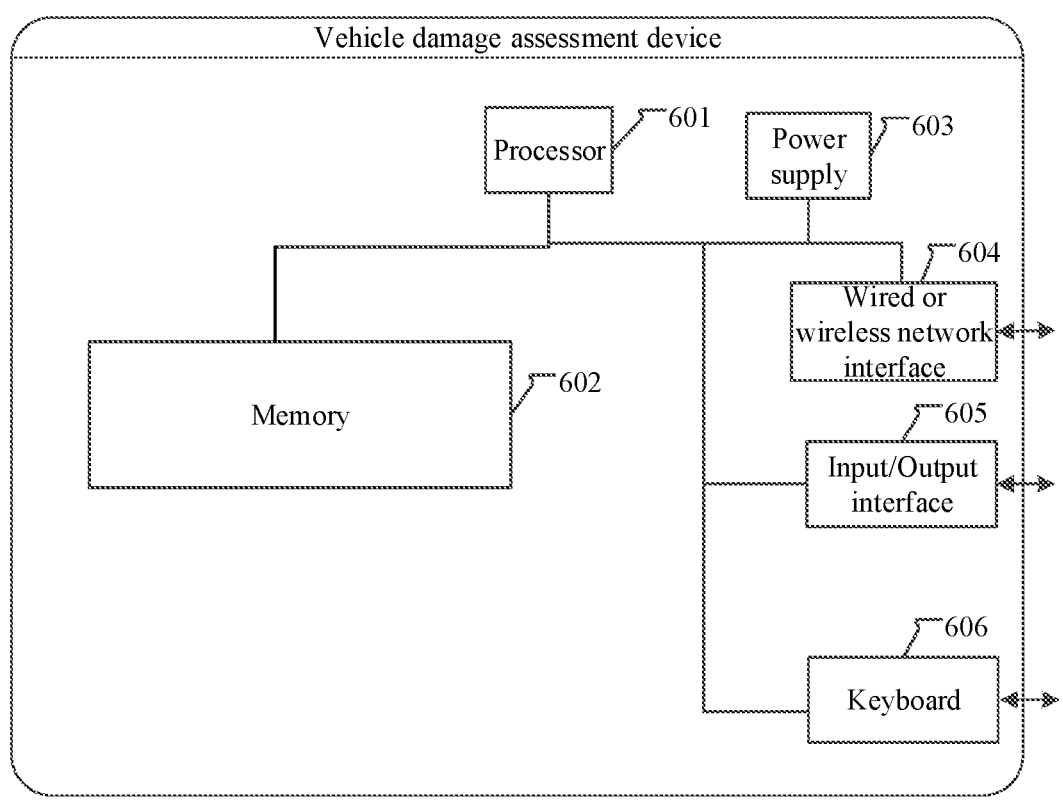
FIG. 6 is still another implementation of a vehicle damage assessment apparatus according to the present specification.

The foregoing has described the vehicle damage assessment apparatus provided in the implementations of the present specification. Based on the same idea, an implementation of the present specification further provides a vehicle damage assessment device, as shown in FIG. 6.

The vehicle damage assessment device can be the terminal device provided in the above implementations.

The vehicle damage assessment device can vary considerably in configuration and performance, and can include one or more processors 601 and a memory 602, where the memory 602 can store data and one or more applications. The memory 602 can be a temporary storage or a persistent storage. The application program stored in memory 602 can include one or more modules (not shown), and each module can include a series of computer-executable instructions in the vehicle damage assessment device. Still further, the processor 601 can be configured to communicate with the memory 602 to execute a series of computer-executable instructions in the memory 602 on a vehicle damage assessment device. The vehicle damage assessment device can also include one or more power supplies 603, one or more wired or wireless network interfaces 604, one or more input/output interfaces 605, and one or more keypads 606.

In particular, in the present implementation, the vehicle damage assessment device includes a memory and one or more programs, where the one or more programs are stored in the memory, and the one or more programs can include one or more modules, and each module can include a series of computer-executable instructions in the vehicle damage assessment device. The one or more programs can be executed by the one or more processors to: collect a first video image including an identification of a target vehicle under damage assessment; in response to that the first video image meets the determined requirement for capturing an identification, collect a second video image including a damage to the target vehicle; and assess the damage to the target vehicle based on the first video image and the second video image in response to that the second video image meets the determined requirement for capturing a vehicle damage feature.

In this implementation of the present specification, the second video image includes a third video image and a fourth video image, and the collecting the second video image including the damage to the target vehicle, and the second video image meeting the determined requirement for capturing a vehicle damage feature includes: collecting a third video image for determining a damaged part of the target vehicle; in response to that the third video image is useable to determine the damaged part of the target vehicle, collecting a fourth video image for determining a degree of damage of the target vehicle; and in response to that the fourth video image is useable to determine the degree of damage of the target vehicle, determining that the second video image meets the determined requirement for capturing a vehicle damage feature.

In this implementation of the present specification, that the first video image meets the determined requirement for capturing an identification includes: extracting an image feature related to the identification of the target vehicle from the first video image; and in response to that the extracted image feature matches a set vehicle identification feature, determining that the first video image meets the determined requirement for capturing an identification.

In this implementation of the present specification, the vehicle identification features include one of or a combination of at least two of the following: a license plate number, a headlight, a wheel hub, a door handle, a vehicle taillight, a vehicle rearview mirror, a fuel tank cover, and a charging port.

In this implementation of the present specification, before determining that the second video image meets the determined requirement for capturing a vehicle damage feature, the method further includes: sending the second video image to a vehicle damage assessment server, for the vehicle damage assessment server to determine whether the second video image meets the determined requirement for capturing a vehicle damage feature and to obtain a determination result; receiving the determination result sent by the damage assessment server; and the assessing the damage to the target vehicle based on the first video image and the second video image in response to that the second video image meets the determined requirement for capturing a vehicle damage feature includes: assessing the damage to the target vehicle based on the first video image and the second video image in response to that the determination result indicates that the second video image meets the determined requirement for capturing a vehicle damage feature.

In this implementation of the present specification, that the first video image meets the determined requirement for capturing an identification includes: determining a first region in which the identification of the target vehicle is located from the first video image; filling in the first region with a determined capturing unit, to obtain a second region including the capturing unit; and in response to that the video image in the second region meets the determined requirement for capturing an identification, highlighting the second region to determine that the first video image meets the determined requirement for capturing an identification.

In this implementation of the present specification, that the second video image meets the determined requirement for capturing a vehicle damage feature includes: determining a third region related to the damage to the target vehicle from the second video image; filling in the third region with a determined capturing unit, to obtain a fourth region including the capturing unit; and in response to that the video image in the fourth region meets the determined requirement for capturing a vehicle damage feature, highlighting the fourth region to determine that the second video image meets the determined requirement for capturing a vehicle damage feature.

In this implementation of the present specification, the assessing the damage to the target vehicle based on the first video image and the second video image includes: sending the first video image and the second video image to a vehicle damage assessment server, for the vehicle damage assessment server to assess the damage to the target vehicle based on the first video image and the second video image to obtain a damage assessment result of the target vehicle; and receiving the damage assessment result sent by the damage assessment server.

According to the vehicle damage assessment device provided in this implementation of the present specification, a first video image including an identification of a target vehicle under damage assessment is collected; in response to that the first video image meets the determined requirement for capturing an identification, a second video image including a damage to the target vehicle is collected; and the damage to the target vehicle is assessed based on the first video image and the second video image in response to that the second video image meets the determined requirement for capturing a vehicle damage feature. In this way, a user only needs to capture the video image of the target vehicle under damage assessment by using a camera device, to assess damage to the target device, and an insurance institution does not to send vehicle damage assessment personnel to the site for survey and damage assessment, so that the insurance institution saves considerable human resources and material resources. In addition, the video images uploaded by users are analyzed by a terminal device or a server, which saves the time required for vehicle damage assessment and improves the efficiency of vehicle damage assessment.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The implementations are described in relation to example application of assessing damage to a vehicle, which does not limit the scope of the specification. The techniques are used in other application scenarios of assessing, inspecting or examining an object. For example, the techniques can be used to assess damage to a building. A first video image may be collected to determine an identification or identity of the building, e.g., architectural features, street address, exterior or interior decoration features. In response to the first video image meeting a threshold for capturing the identity of the building, a second video image is collected to determine damage to the building. Similarly, a user may be prompted by a terminal device, e.g., having a client application installed thereon, to capture the video images. Further, a drone may be controlled by a remote or a server to collect the video images of the building. The drone may have programs installed thereon to make determinations on whether the video images meet the relevant threshold for capturing an image for determining building identity and for capturing an image for determining damage to the building.

In the 1990s, whether technology improvement was hardware improvement (for example, improvement of a circuit structure, such as a diode, a transistor, or a switch) or software improvement (improvement of a method procedure) could be clearly distinguished. However, as technologies developed, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively, the device configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For convenience of description, the above devices are described separately in terms of their functions. Of course, during implementation of one or more implementations of the present specification, the functions of each module can be implemented in at least one of software or hardware.

A person skilled in the art should understand that the implementations of the present specification can be provided as methods, systems, or computer program products. As such, one or more implementations of the present specification can take the form of complete hardware implementations, complete software implementations, or implementations incorporating software and hardware. In addition, one or more implementations of the present specification can use a form of a computer program product that is implemented on one or more computer-usable storage media (including but not limited to a disk memory, a CD-ROM, an optical memory, etc.) that include computer-usable program code.

The present specification is described with reference to at least one of a flowchart or block diagram of the method, device (system), and computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computer device. Based on the definition in the present specification, the computer readable medium does not include transitory media such as a modulated data signal and carrier.

It is also worthwhile to note that terms "include", "include" or any other variant is intended to cover non-exclusive inclusion, so that processes, methods, commodities or devices that include a series of elements include not only those elements but also other elements that are not explicitly listed, or elements inherent in such processes, methods, commodities or devices. An element described by "includes a . . . " further includes, without more constraints, another identical element in the process, method, product, or device that includes the element.

A person skilled in the art should understand that the implementations of the present specification can be provided as methods, systems, or computer program products. Therefore, one or more implementations of the present specification can use a form of hardware only implementations, software only implementation, or implementations with a combination of software and hardware. In addition, one or more implementations of the present specification can use a form of a computer program product that is implemented on one or more computer-usable storage media (including but not limited to a disk memory, a CD-ROM, an optical memory, etc.) that include computer-usable program code.

One or more implementations of the present specification can be described in the general context of computer-executable instructions, for example, a program module. Generally, the program module includes a routine, a program, an object, a component, a data structure, etc., executing a specific task or implementing a specific abstract data type. One or more implementations of the present specification can also be practiced in distributed computing environments where tasks are performed by remote processing devices connected through a communications network. In a distributed computing environment, the program module can be located in both local and remote computer storage media including storage devices.

The implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

The above descriptions are merely examples of the present specification and are not intended to limit the present specification. For a person skilled in the art, the present specification can be subject to various modifications and variations. Any modification, equivalent replacement, or improvement made without departing from the spirit and principle of the present specification shall fall within the scope of the claims.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
   collecting a first image of an object, the collecting the first image including:
   receiving an initial image of the object;
   automatically determining through deep learning whether the initial image contains an identification of the object; and
   in response to determining that the initial image contains the identification of the object, automatically capturing a follow-up image of the object through a camera and by automatically aligning a camera lens of the camera with a portion of the object that contains the identification of the object, the portion of the object that contains the identification of the object being determined based on the initial image;
   in response to the first image meeting a first threshold, collecting a second image containing a damage to the object; and
   assessing the damage to the object based on the second image in response to the second image meeting a second threshold.

2. The method according to claim 1, wherein the collecting the second image comprises:
   collecting a third image to determine a damaged part of the object; and
   in response to the third image being useable to determine the damaged part of the object, collecting a fourth image to determine a degree of damage to the object.

3. The method of claim 2, comprising:
   determining that the fourth image is useable to determine the degree of damage to the object; and
   in response to the fourth image being determined as useable to determine the degree of damage to the object, determining that the second image meets the second threshold.

4. The method according to claim 1, comprising:
   extracting an image feature related to the identification of the object from the follow-up image of the object;
   comparing the image feature with an identified object identification feature; and
   in response to the image feature matching the identified object identification feature, determining that the first image meets the first threshold.

5. The method according to claim 1, wherein the determining that the second image meets the second threshold includes:
   sending the second image to an object damage assessment server for the object damage assessment server to determine whether the second image meets the second threshold; and
   receiving a determination result sent by the object damage assessment server on whether the second image meets the second threshold.

6. The method according to claim 1, comprising:
   determining a first region in which the identification of the object is located from the first image;
   filling in the first region with a capturing unit to obtain a second region including the capturing unit;
   capturing an image of the second region; and
   in response to the image of the second region meeting the first threshold, highlighting the second region.

7. The method according to claim 1, comprising:
   determining a third region related to the damage to the object from the second image;
   filling in the third region with a capturing unit to obtain a fourth region including the capturing unit;
   capturing an image of the fourth region; and
   in response to the image of the fourth region meeting the second threshold, highlighting the fourth region.

8. The method according to claim 1, wherein the assessing the damage to the object based on the second image includes:
   sending the second image to an object damage assessment server for the object damage assessment server to assess the damage to the object based on the second image to obtain a damage assessment result; and
   receiving the damage assessment result sent by the object damage assessment server.

9. The method according to claim 1, wherein the camera is positioned in a drone.

10. A method, comprising:
receiving a first image of a vehicle;
automatically determining through artificial intelligence whether the first image contains a damaged portion of the vehicle;
in response to determining that the first image contains the damaged portion of the vehicle, automatically capturing a second image of the vehicle through a camera and by automatically focusing a camera lens of the camera toward the damaged portion of the vehicle;
determining whether the second image meets a threshold for damage assessment; and
in response to determining that the second image meets the threshold for damage assessment, assessing a damage to the vehicle based on the second image.

11. The method according to claim 10, wherein the capturing the second image comprises:
capturing a third image to determine a position of the damaged portion on the vehicle; and
capturing a fourth image to determine a degree of damage to the vehicle at the position.

12. The method according to claim 11, comprising:
extracting an image feature from the third image; and
determining whether the image feature extracted from the third image indicates the position of the damaged portion on the vehicle, wherein the capturing the fourth image is conducted in response to determining that the image feature extracted from the third image indicates the position of the damaged portion on the vehicle.

13. The method according to claim 11, wherein the determining that the second image meets the threshold for damage assessment includes:
determining whether the fourth image is useable to determine the degree of damage to the vehicle; and
in response to determining that the fourth image is useable to determine the degree of damage to the vehicle, determining that the second image meets the threshold.

14. The method according to claim 10, wherein the assessing the damage to the vehicle based on the second image includes:
sending the second image to a vehicle damage assessment server for the vehicle damage assessment server to assess the damage to the vehicle based on the second image to obtain a damage assessment result; and
receiving the damage assessment result sent by the vehicle damage assessment server.

15. The method according to claim 10, wherein the camera is positioned in a drone.

16. A system, comprising:
a processor; and
a memory storing computer-executable instructions, which when executed by the processor, configure the processor to conduct acts including:
receiving a first image of a vehicle;
automatically determining through artificial intelligence whether the first image contains a damaged portion of the vehicle;
in response to determining that the first image contains the damaged portion of the vehicle, automatically capturing a second image of the vehicle through a camera by automatically aligning a camera lens of the camera with the damaged portion of the vehicle;
determining whether the second image meets a threshold for damage assessment; and
in response to determining that the second image meets the threshold for damage assessment, assessing a damage to the vehicle based on the second image.

17. The system according to claim 16, wherein the capturing the second image comprises:
capturing a third image to determine a position of the damaged portion on the vehicle; and
capturing a fourth image to determine a degree of damage to the vehicle at the position.

18. The system according to claim 17, wherein the acts include:
extracting an image feature from the third image; and
determining whether the image feature extracted from the third image indicates the position of the damaged portion on the vehicle,
wherein the capturing the fourth image is conducted in response to determining that the image feature extracted from the third image indicates the position of the damaged portion on the vehicle.

19. The system according to claim 17, wherein the determining that the second image meets the threshold for damage assessment includes:
determining whether the fourth image is useable to determine the degree of damage to the vehicle; and
in response to determining that the fourth image is useable to determine the degree of damage to the vehicle, determining that the second image meets the threshold.

20. The system according to claim 16, comprising a drone communicatively coupled to the processor and the memory, wherein the camera is positioned on the drone.

* * * * *